July 21, 1936.  J. W. DYER ET AL  2,048,326
DEVICE FOR DAMPING THE OSCILLATION OF THE
REVOLVING WINGS OR BLADES OF AIRCRAFT
Filed June 13, 1935
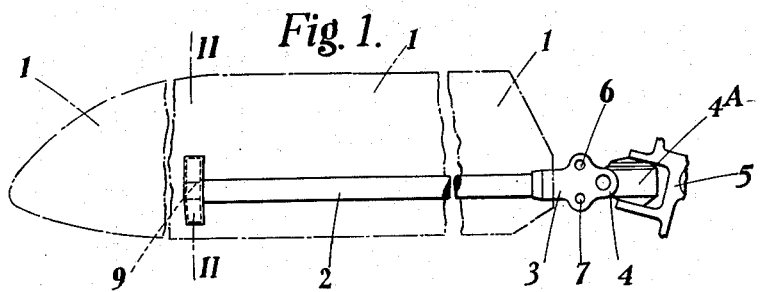
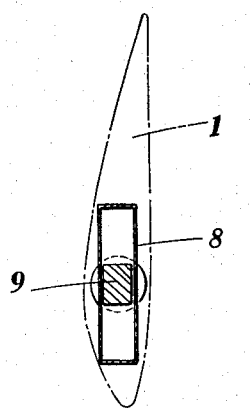 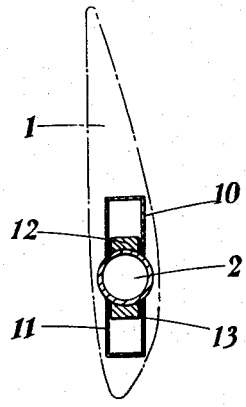
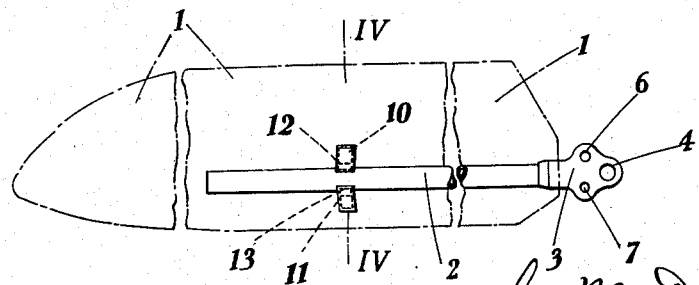

UNITED STATES PATENT OFFICE 2,048,326

DEVICE FOR DAMPING THE OSCILLATION OF THE REVOLVING WINGS OR BLADES OF AIRCRAFT

John William Dyer and David Kay, Edinburgh, Scotland, assignors to Kay Gyroplanes Limited, Edinburgh, Scotland Application June 13, 1935, Serial No. 26,488
In Great Britain June 26, 1934

13 Claims. (Cl. 244—19)

This invention relates to the revolving wings or blades of aircraft of the type comprising a system of revolving wings or blades adapted to support or to assist in supporting the aircraft in flight and in particular to such wings or blades as are freely rotatable under the action of the air flow whilst the aircraft is in flight.

In aircraft embodying auto-rotative rotor systems, it is usual to mount the revolving wings or blades of the rotor on a central hub in such a manner that they are capable of substantially vertical flapping movements and also of a limited amount of free movement relative to each other in the plane of rotation of the rotor in either direction from the true radial position. Difficulty has been experienced, however, in that wings or blades so mounted have been found to have a tendency to oscillate rapidly in the plane of rotation under certain conditions of speed and resistance, e. g., when the rotor is being started up prior to flight or slowed down, and also when the rotation of the wings or blades is being resisted in flight by the air pressure. It has also been found extremely difficult to overcome this tendency to rapid oscillation, but endeavours have been made from time to time to do so by providing some form of shock-absorber which comes into action at the end of the free movement of the blade in the plane of rotation and is intended to check the rebound of the blade due to reaction or its natural resiliency. For ideal conditions the shock-absorbers should be non-resilient but this is a condition which is not at all easy to obtain.

The object of the present invention is to provide means which will materially assist in damping-out the objectionable oscillations mentioned above, whether used in conjunction with shock-absorbing devices or otherwise.

With the above object in view, according to the present invention the rotating blades of aircraft of the type referred to are provided with inertia means carried by the blade and arranged to remain inoperative during the free movement of the latter in the plane of rotation of the blade relative to the normal radial position, until the reversal of movement of the blade when said means operate to oppose the rebound of the blade, which takes place when the latter has reached the limit of its free movement, and thus to damp or assist in damping vibrations or oscillations of the blade.

The inertia means may conveniently consist of or comprise one or more weights which is or are capable of movement relatively to the blade in a direction lateral with respect to the span of the blade and independently of the direction of rotation of the latter, said weights or weight acting to oppose the rebound of the blade in either direction in the plane of rotation and thus to damp or assist in damping vibrations or oscillations of the blade in the said plane.

The weight or weights can be arranged to slide relatively to the blade in a direction lateral with respect to the span and slightly inclined towards the tip or root of the blade and (or) to the plane of rotation of the blade, means (which may be adjustable) being provided for limiting the movement of the weight or weights in one or both directions.

With arrangements of the above character, it will be evident that when the blade is accelerated in its rotary motion and arrives at the limit of its free movement in the plane of rotation, the weight or weights, being independent, will have lagged behind the blade owing to inertia. On the other hand, when the rebound of the blade commences, the weight or weights will still be moving forward and will consequently check or assist in checking the return movement of the blade.

The form of the weight may, of course, vary considerably without departing from the invention, as also may the mode of guiding and limiting its lateral movement. For instance, the weight may be either solid or liquid, or even granulated, whilst its lateral movement may be obtained either by sliding, rolling or swinging.

In one convenient embodiment of the invention, the damping device is arranged at the tip end of the main longitudinal spar of the blade and consists of a weight engaged by a suitable guide mounted on the spar. With this arrangement, the weight can travel from end to end of its guide.

In an alternative arrangement the damping device is arranged at a point in the length of the longitudinal spar, and in this case comprises two weights and guides therefor, one weight and guide being placed on either side of the spar.

The guide may take any convenient form, such as a box or casing or rails, the exact form of the guide being, of course, largely determined by the form of the weight, but in some cases it may be inclined slightly towards the root of the blade so that during the normal rotation of the blade the centrifugal action will tend to maintain the weight or weights in a central position.

If the present invention is used in conjunction with a shock-absorbing device at the root of the blade, it is preferred to employ a shock-absorber having as little resilience as possible and, for this purpose, the arrangement forming the subject of our co-pending patent application No. 5,080 of February 5th, 1935 is suitable.

Two constructional forms of the present invention, as applied to the blades of an auto-rotative rotor provided with shock-absorbing devices as described and claimed in the specification of our said co-pending application are shown, by way of example, on the accompanying drawing, whereon:—

Fig. 1 is a part diagrammatic plan view of a blade in which the damping device is arranged at the tip end of the longitudinal spar;

Fig. 2 is an end elevation of the damping device shown in Fig. 1;

Fig. 3 is a part diagrammatic plan view of a blade having a modified damping device arranged intermediate the ends of the longitudinal spar; and Fig. 4 is an end elevation of the damping device shown in Fig. 3.

Referring first to Figs. 1 and 2, it will be seen that the blade 1 comprises a single longitudinal spar 2 to which spaced transverse ribs or formers (not shown) are secured in the building up of the blade. The root end of the spar is provided with a member 3 which is turnably connected by a pivot pin 4 to a link 4A articulated to the central hub of the rotor, part of which is shown at 5. In this manner, the blade is capable of substantially vertical flapping movements and also of movement in either direction in a substantially horizontal plane about the pivot 4. The movement about the pivot 4 is, however, limited by means of shock-absorbing devices arranged in the link 4A and cooperating with pins 6 and 7 passing through the forked end of the member 3. A box or casing 8 is secured to the outer end of the spar 2 and encloses a weight 9 which is slidable freely in the box or casing. As shown, the casing 8 is arranged transversely of the spar 1 and substantially centrally of the upper and lower surfaces of the blade.

The weight 9 is thus capable of movement in both directions relatively to the spar 2 within the casing 8 transverse to the spar 2, its movement being limited by the end walls of the casing. Thus, if the blade should be accelerated in its rotary movement, the weight, being capable of slidable movement relatively to the blade, will lag behind the blade owing to its inertia. On the other hand, when the rebound or return movement of the blade commences, the weight will still be moving in the original direction of movement of the blade and will thus check the return movement of the blade by contact with the adjacent end wall of the casing 8.

In the modified arrangement shown in Figs. 3 and 4, two casings 10 and 11 are arranged on opposite sides of the longitudinal spar 2 and enclose respectively a slidable weight 12 and a slidable weight 13. It will be seen from Fig. 3 that each of the two casings is inclined slightly towards the root end of the blade, such an arrangement having the advantage that, during the normal rotation of the blade the centrifugal action will tend to maintain the weights in central positions.

It may be found that on certain types of rotor blades it is unnecessary to incline the guide for the weight towards the root end of the blade and it may even be advantageous to incline the guide in the reverse direction. Further, one of the guides on one side of the spar may be inclined in one direction while the other may be set square to the spar or inclined in the opposite direction. Moreover, a slight inclination of the guide from the horizontal would induce secondary effects (owing to the flapping action of the blades) which may be found useful under certain circumstances. Consequently, the guide members may be set (a) normal to the spar, (b) inclined at an angle other than 90° to the longitudinal axis of the spar, (c) substantially parallel to the plane of rotation of the blades, (d) inclined at an angle to the plane of rotation or they may be arranged so as to combine the above settings.

The reason for inclining the guide members out of the plane of rotation is to make the path of the weight follow more closely to the actual path of the blade, which latter path, of course, owing to the flapping of the blades, is not parallel to the earth's surface. Obviously, the guide members can be curved or, in the case of the guide member arranged at the end of the spar, this member could be made in two parts disposed angularly but providing an uninterrupted path for the weight.

It will be appreciated that if solid weights, such as those shown in the drawing, are used they can be guided upon guide rails instead of in casings or they can be made to roll or swing. Solid weights need not necessarily be used, however, as they may be granular or liquid. Any suitable number of weights may be used along a spar and the constructions of Figs. 1 and 2 and Figs. 3 and 4 can be used in combination. Means, such, for example, as pins screwed through the outer end walls of the casings, can be provided for adjusting the degree of movement to be given to the weights and obviously, the damping devices can be arranged outside instead of inside the blades. Springs may also be used in conjunction with the weights.

The invention can be used with or without the combination of shock-absorbing devices provided for damping the movements of the blades relative to each other in the plane of rotation of the blades. The invention may be used, for example, in conjunction with blades which are sufficiently resilient to allow free movements of the blades relative to each other in the plane of rotation.

We claim:

1. A lifting rotor for aircraft having a wing or blade, inertia means loosely connected with the blade to allow relative inertia produced movement of said inertia means and blade in the direction of blade movement, and means for limiting the relative movement of said inertia means and blade, whereby vibrations or oscillations of the blade are dampened.

2. A lifting rotor for aircraft having a wing or blade, slidable inertia means loosely connected with the blade to allow relative inertia produced movement of said inertia means and blade in the direction of blade movement, means to limit free movement of the blade in its plane of rotation relative to the normal radial position of the blade, and means for limiting the relative movement of said inertia means and blade, the arrangement being such that said inertia means is inoperative during such free movement of the blade in one direction.

3. In a lifting rotor for aircraft, a blade or wing, as in claim 1, in which the inertia means comprises a slidable weight movable relatively to the blade in a direction lateral to the span thereof and independently of the direction of rotation of the blade.

4. A revolving aircraft wing or blade for aircraft of the character described, that is subject to vibrations or oscillations in the plane of its rotation, having shiftable inertia means for damping such oscillations or vibrations and loosely connected with the blade to allow relative inertia produced movement of said inertia means and blade in the direction of blade movement, and means to limit the movement of the inertia means.

5. A revolving aircraft wing or blade, as in claim 4, having means to limit free movement of the blade in its plane of rotation relative to the normal radial position of the blade, the arrangement being such that said inertia-means is inoperative during such free movement of the blade in one direction.

6. A revolving aircraft wing or blade, as in claim 4, having means to direct at an incline, the relative movement of inertia-means and blade.

7. A revolving aircraft wing or blade of the character described having two slidable inertia-subject weights, means to guide movement of one weight in opposite directions upon one side of a plane parallel to or passing through the mean longitudinal axis of the blade and transverse to the chord, means to guide the other weight movement in both directions on the opposite side of said plane, and means to limit movement of both weights.

8. A revolving aircraft blade, as in claim 4, comprising weight-form inertia-means, a casing in which such means is shiftable, and a longitudinal blade spar carrying said casing.

9. A revolving aircraft wing or blade, as in claim 4, in which the inertia-means comprises two weights each in a casing, and the casings being on opposite sides of a longitudinal spar of the blade.

10. A revolving wing or blade for aircraft of the character described, comprising means for damping vibrations or oscillating of the blade in the plane of its rotation, said means including a weight carried by the blade and freely shiftable relatively thereto in a direction lateral with respect to the span of the blade, whereby relative inertia produced movement is provided between said weight and said blade upon vibration or oscillation of the blade, and means for limiting the movements of the weight in both directions.

11. A revolving wing or blade, as set forth in claim 10, further characterized by means for directing the movement of said weight in a path slightly inclined toward the tip or root of the blade.

12. A revolving wing or blade as set forth in claim 10, further characterized by means for directing the movement of said weight in a path slightly inclined to the plane of rotation of the blade.

13. A revolving wing or blade for aircraft of the character described, comprising means for damping vibrations or oscillating of the blade in the plane of its rotation, said means including a freely shiftable weight on the blade and means for confining the shifting movement of said weight to a direction substantially lateral of the span of the blade to limited degrees in both directions, when the blade vibrates or oscillates.

DAVID KAY.
JOHN WILLIAM DYER.